United States Patent

Moosavi et al.

(10) Patent No.: US 9,135,429 B2
(45) Date of Patent: Sep. 15, 2015

(54) MOBILE DEVICE FOR AUTHENTICATING A DEVICE ACCESSORY

(75) Inventors: Vahid Moosavi, Kitchener (CA); Gabriel Deen Khan, Waterloo (CA); Scott Douglas Rose, Waterloo (CA)

(73) Assignee: BlackBerry Limited, Waterloo (CA)

( * ) Notice: Subject to any disclaimer, the term of this patent is extended or adjusted under 35 U.S.C. 154(b) by 662 days.

(21) Appl. No.: 12/977,245

(22) Filed: Dec. 23, 2010

(65) Prior Publication Data

US 2012/0167232 A1 Jun. 28, 2012

(51) Int. Cl.
*H04L 29/06* (2006.01)
*G06F 21/44* (2013.01)
*H04W 12/06* (2009.01)

(52) U.S. Cl.
CPC ............... *G06F 21/44* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 7,548,746 B2 * | 6/2009 | Kalke | | 455/418 |
| 7,957,728 B2 * | 6/2011 | Kalke | | 455/418 |
| 8,208,853 B2 * | 6/2012 | Lydon et al. | | 455/41.2 |
| 8,230,045 B2 * | 7/2012 | Kawachiya et al. | | 709/219 |
| 8,438,288 B2 * | 5/2013 | Garcia Jurado Suarez et al. | | 709/227 |
| 8,509,691 B2 * | 8/2013 | Lydon et al. | | 455/41.2 |
| 2003/0008680 A1 * | 1/2003 | Huh et al. | | 455/557 |
| 2003/0162562 A1 * | 8/2003 | Curtiss et al. | | 455/556 |
| 2004/0034579 A1 | 2/2004 | Xu et al. | | |
| 2004/0137890 A1 * | 7/2004 | Kalke | | 455/418 |
| 2004/0155106 A1 | 8/2004 | Schmidtberg et al. | | |
| 2006/0071778 A1 | 4/2006 | Vesikivi et al. | | |
| 2006/0156415 A1 * | 7/2006 | Rubinstein et al. | | 726/27 |
| 2008/0141361 A1 | 6/2008 | Balfanz et al. | | |
| 2009/0021350 A1 * | 1/2009 | Hatta et al. | | 340/10.1 |
| 2009/0094681 A1 | 4/2009 | Sadler et al. | | |
| 2009/0187967 A1 * | 7/2009 | Rostaing et al. | | 726/1 |
| 2009/0193500 A1 | 7/2009 | Griffin et al. | | |
| 2010/0045441 A1 | 2/2010 | Hirsch et al. | | |
| 2010/0121736 A1 * | 5/2010 | Kalke | | 705/27 |
| 2010/0278345 A1 * | 11/2010 | Alsina et al. | | 380/283 |
| 2010/0306538 A1 * | 12/2010 | Thomas et al. | | 713/168 |
| 2011/0167262 A1 * | 7/2011 | Ross et al. | | 713/168 |
| 2012/0003935 A1 * | 1/2012 | Lydon et al. | | 455/41.2 |

FOREIGN PATENT DOCUMENTS

JP 2010061490 A 3/2010
WO 2009066212 A1 5/2009

OTHER PUBLICATIONS

1. Bluetooth Special Interest Group—Simple Pairing Whitepaper—http://docs.google.com/viewer?a=v&q=cache:rHrh1sZyhHgJ:bluetooth.com.
European Search Report from corresponding EP Application dated May 11, 2011.
Canadian Intellectual Property Office, Office Action on Application No. 2,762,550 , Issued on Jun. 4, 2015.

* cited by examiner

*Primary Examiner* — Michael R Vaughan
(74) *Attorney, Agent, or Firm* — Moffat & Co.

(57) ABSTRACT

A mobile device for authenticating a device accessory is disclosed. The mobile device receives a unique identifier from a device accessory, sends the received unique identifier to a server via a communication network, and receives information from the server relating to the unique identifier.

17 Claims, 7 Drawing Sheets

MOBILE DEVICE FOR AUTHENTICATING A DEVICE ACCESSORY

TECHNICAL FIELD

The present disclosure relates to a mobile device and, in particular, to a mobile device for authenticating a device accessory.

BACKGROUND

With the increase in popularity of mobile devices, consumer appetite for device accessories have increased dramatically over the years. Device accessories may range from providing essential functionalities, such as charging a battery, to non-essential features, such as enabling hands-free communication. Because of this popularity, there are many third party companies developing device accessories for use with mobile devices. However, one of the shortcomings of third party device accessories is that quality of such accessories cannot be controlled by the manufacturers of the mobile devices. Thus, user experience of the device accessory and the mobile device may be diminished.

A mobile device that is able to authenticate a device accessory would thus be highly desirable.

BRIEF DESCRIPTION OF THE DRAWINGS

These and other features of the disclosure will become more apparent from the following description in which reference is made to the appended drawings wherein.

DETAILED DESCRIPTION

While the patent disclosure is described in conjunction with the specific embodiments, it will be understood that it is not intended to limit the patent disclosure to the described embodiments. On the contrary, it is intended to cover alternatives, modifications, and equivalents as may be included within the scope of the patent disclosure as defined by the appended claims. In the above description, numerous specific details are set forth in order to provide a thorough understanding of the present patent disclosure. The present patent disclosure may be practiced without some or all of these specific details.

In this specification and the appended claims, the singular forms "a," "an," and "the" include plural references unless the context clearly dictates otherwise. Unless defined otherwise, all technical and scientific terms used herein have the same meaning as commonly understood to one of ordinary skill in the art to which this disclosure belongs.

It will be further understood that the terms "comprises" or "comprising", or both when used in this specification, specify the presence of stated features, integers, steps, operations, elements, and/or components, but do not preclude the presence or addition of one or more other features, integers, steps, operations, elements, components, and/or groups thereof.

According to an aspect of the present technology, a method entails receiving at a mobile device a unique identifier from a device accessory, sending the received unique identifier to a server via a communication network, and receiving information from the server relating to the unique identifier.

Another aspect of the present technology is a computer readable storage medium upon which are stored instructions in code that are configured to perform the steps of the foregoing method when the computer readable medium is loaded into memory and executed on a processor of a mobile device.

According to a further aspect of the present technology, a mobile device for authenticating a device accessory is disclosed. The mobile device includes a proximity detector, a communication module for communicating with a server to authenticate a unique identifier of the device accessory, and a feature module for enabling and disabling functionality of the mobile device.

Figure 1:
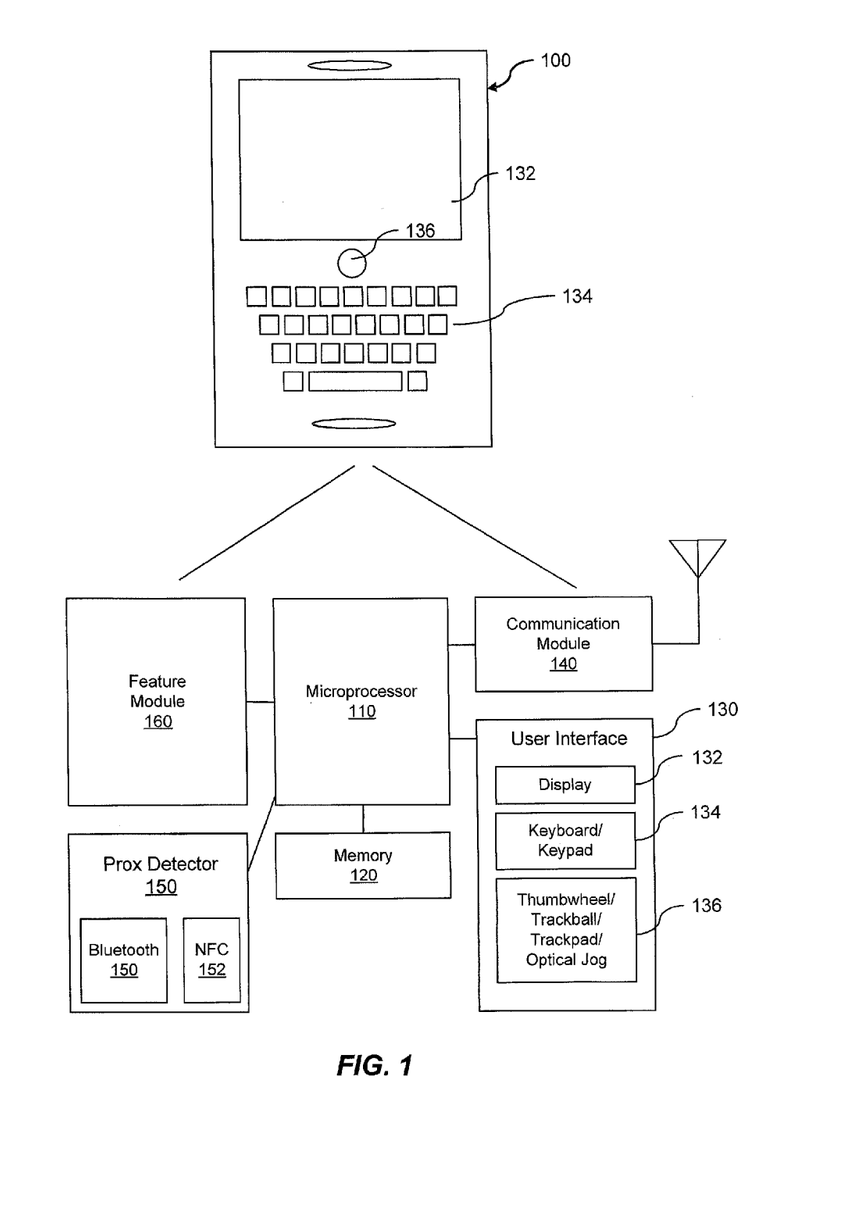
FIG. 1 is a schematic depiction of a mobile device on which the present technology can be implemented.

Referring to FIG. 1, a schematic depiction of a mobile device 100 implementing an embodiment of the present technology is shown. It should be expressly understood that this figure is intentionally simplified to show only certain main components. The mobile device 100 may include other components beyond what is illustrated in FIG. 1.

As shown in FIG. 1, the mobile device 100 includes a microprocessor 110 which interacts with memory 120. The memory 120 may be in the form of random access memory (RAM) or flash memory or both. The memory 120 may be in other formats such as a magnetic disk. The mobile device 100 includes one or more input/output devices or user interfaces 130, such as a display screen 132 (e.g. a small LCD screen or touch-sensitive display screen), and a keyboard or keypad 134. The user interface may also include a thumbwheel, trackball, trackpad or optical jog pad 136. The device may also include a USB port or serial port (not shown) for connecting to peripheral equipment.

The mobile device 100 also includes a communication module 140 for communicating with one or more base stations (e.g. for telephone communication). The communication module 140 is also used to communicate with a server (e.g. 200 in FIG. 2) for authenticating a unique identifier of a device accessory (e.g. holster 700 in FIG. 7 and charging cradle 800 in FIG. 8).

The mobile device 100 further includes a proximity detector 150. The short-range proximity detector 150 may also include a near-field communication (NFC) chip 152 (also referred to herein as an NFC interface) or Bluetooth® transceiver 154.

Figure 2:
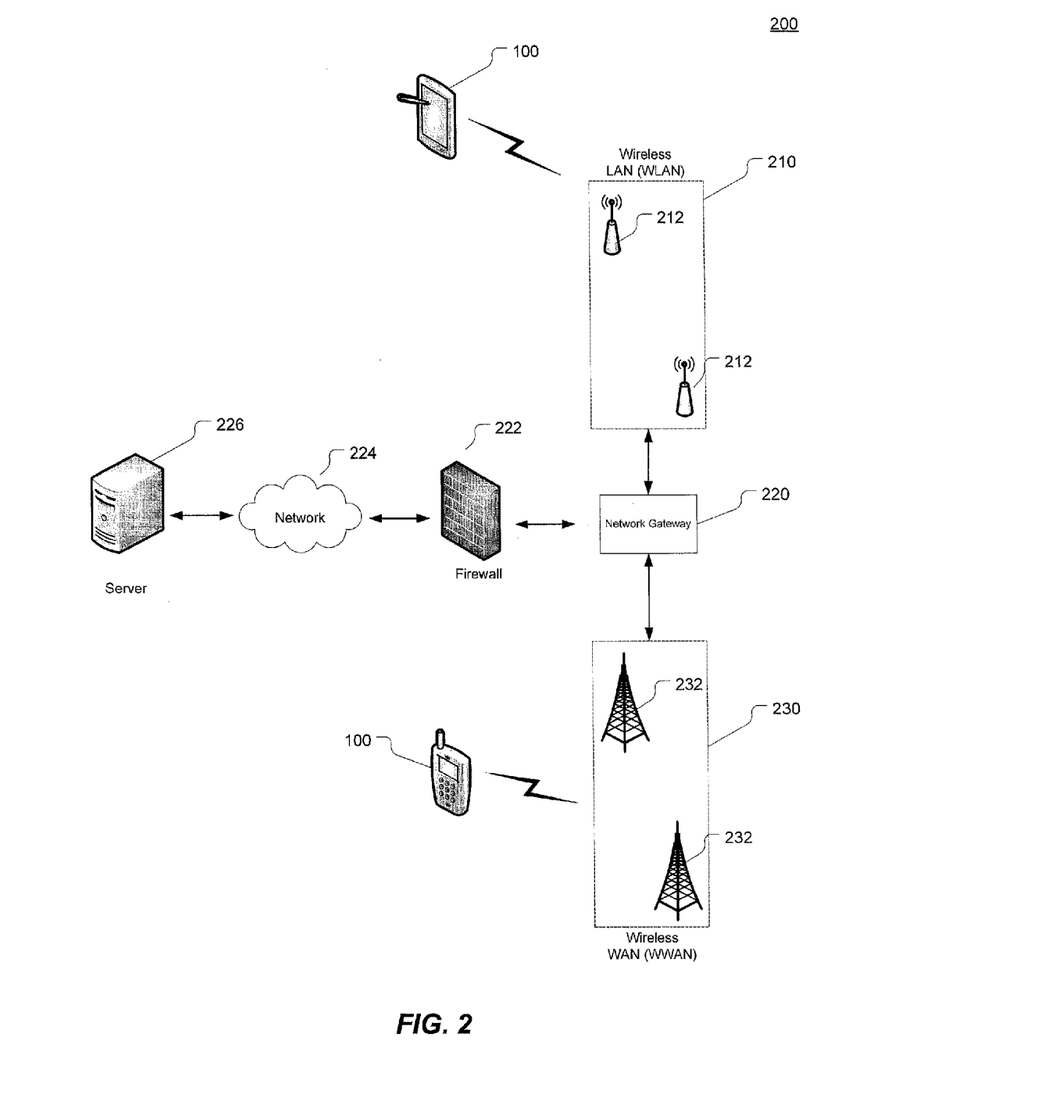
FIG. 2 is a block diagram of a communication system in which an embodiment of the present technology may be applied.

Now turning to FIG. 2, there is shown a block diagram of a communication system 200 in which an embodiment of the present technology can be applied. It should be expressly understood that this figure is intentionally simplified to show only certain main components. The communication system 200 may include other components beyond what is illustrated in FIG. 2.

The communication system 200 includes a number of mobile devices 100 which may be connected to the communication system 200 in any of several different ways. Accordingly, several instances of mobile device 100 are depicted in FIG. 2 employing different example ways of connecting to the communication system 200. Mobile device 100 is connected to the server 226 using wireless technologies. In other embodiments, mobile device 100 may use wired communication technologies.

In one embodiment, mobile device 100 may connect to the server 226 using wireless LAN (WLAN) 210. WLAN 210 may be implemented as any suitable wireless access network technology. By way of example, but not limitation, WLAN 210 may be implemented using IEEE 802.11x standards (sometimes referred to as Wi-Fi) such as, for example, the IEEE 802.11a, 802.11b, 802.11g, and/or 802.11n standard. Other communication protocols may be used for the WLAN 210 in other example embodiments such as, for example, IEEE 802.16e (also referred to as Worldwide Interoperability for Microwave Access or "WiMAX"), or IEEE 802.20 (also referred to as Mobile Wireless Broadband Access).

The WLAN 210 includes one or more wireless RF Access Points (AP) 212 (two of which are shown in FIG. 2) that collectively provide a WLAN coverage area. The WLAN 210 is then connected to the network gateway 220 for communication with the server 226.

In another embodiment, mobile device 100 may connect to the server 226 using wireless WAN (WWAN) 230. By way of example, but not limitation, the WWAN 230 may be implemented as a wireless network that includes a number of transceiver base stations 232 (two of which are shown in FIG. 2) where each of the base stations 232 provides wireless Radio Frequency (RF) coverage to a corresponding area or cell. In some example embodiments, the WWAN 230 may use the following network technologies: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA1010, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other network technologies. Although WWAN 230 is described as a "Wide-Area" network, that term is intended herein also to incorporate wireless Metropolitan Area Networks (WMAN) and other similar technologies for providing coordinated service wirelessly over an area larger than that covered by typical WLANs.

Using wireless or wired technologies, mobile device 100 connects to the network gateway 220. The internal network 224 is typically behind a firewall 222, which serves to safeguard the internal network 224 from unauthorized access. Only authorized mobile device 100 is granted access to the server 226.

Figure 3:
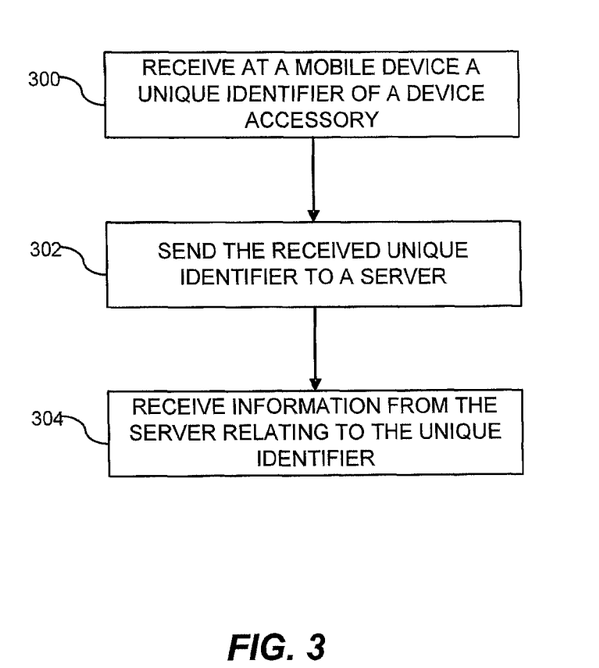
FIG. 3 is a flowchart outlining the main steps of the mobile device of FIG. 1 for authenticating a device accessory.

Thus, the mobile device 100 is able to authenticate a device accessory using the communication network 200. Now referring to both FIGS. 1 and 3, the mobile device 100 receives a unique identifier of the device accessory (i.e. step 300 in FIG. 3). In one embodiment, the mobile device 100 may use the proximity detector 150 to detect the presence of the device accessory and thereafter receive the unique identifier. The mobile device 100 then sends the unique identifier to a server (i.e. step 302 in FIG. 3) using the communication module 140. After processing, the mobile device 100 receives information from the server relating to the unique identifier (i.e. step 304 in FIG. 3).

Figure 4:
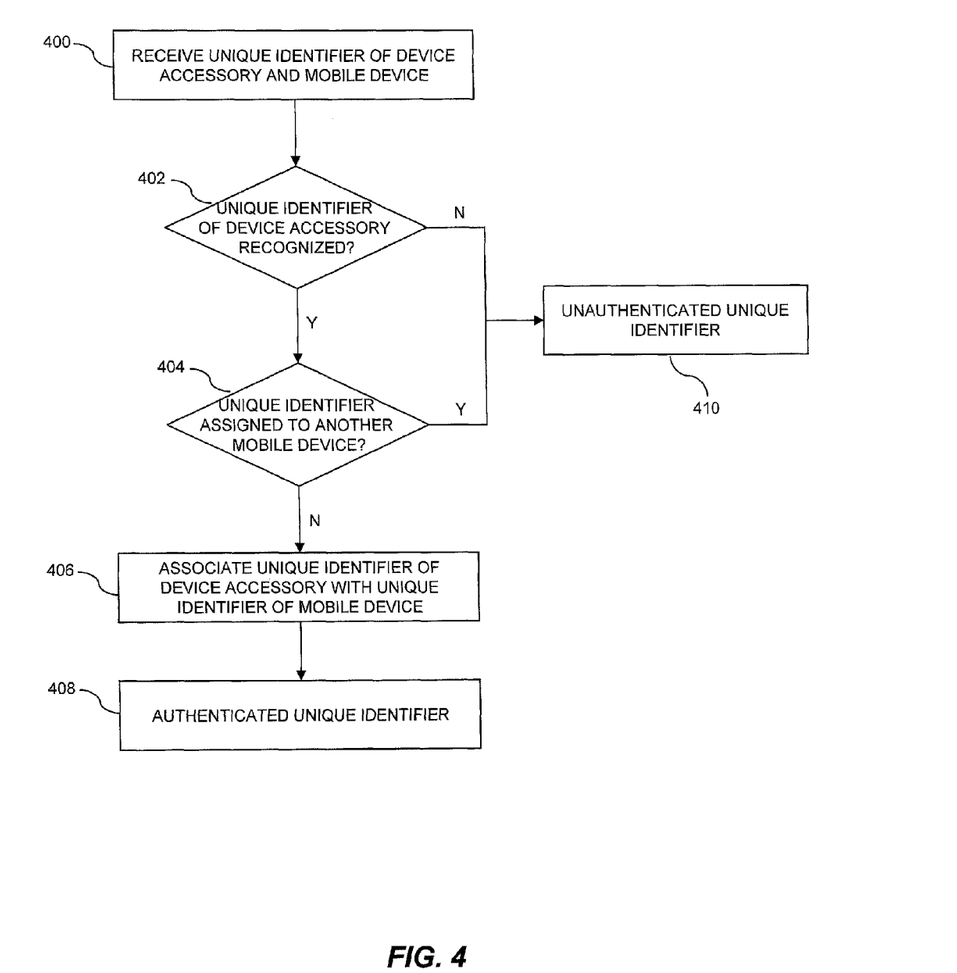
FIG. 4 is a flowchart outlining the main steps of the server of FIG. 2 for authenticating a device accessory.

Now referring to FIG. 4, the server 226 receives the unique identifier of the device accessory and, optionally, the unique identifier of the mobile device (i.e. step 400 in FIG. 4). The server 226 then confirms that the unique identifier of the device accessory is one that is recognized by the server 226 (i.e. step 402 in FIG. 4). The server 226 may maintain a list of one or more recognized unique identifiers in a memory. This list of one or more recognized unique identifiers may have been, for example, created by the manufacturer certifying the authenticity of a device accessory. This allows the prevention of third party accessories that may not properly follow recommended specification thereby diminishing the quality of the user experience. Alternatively, or additionally, the list of one or more recognized unique identifiers may be maintained at another location such as another remote server or external storage (not shown). With this list, the server 226 compares whether the unique identifier of the device accessory received is one of the one or more recognized unique identifiers.

If the unique identifier of the device accessory is one that is recognized by the server 226, the server 226 may further verify if the recognized unique identifier is associated with another mobile device (i.e. step 404 in FIG. 4). This ensures that a previously authenticated device accessory cannot be used by another mobile device. This may occur, for example, if the device accessory is lost or stolen. If the recognized unique identifier of the device accessory is not associated with any mobile device, the unique identifier of the mobile device 100 is associated with the recognized unique identifier of the device accessory (i.e. step 406 in FIG. 4). Thus, the mobile device 100 is "paired" with the device accessory.

The determination of the server 226 is subsequently communicated to the mobile device 100, with the communication including an indication with respect to the authenticity of the device accessory. In one implementation, if the unique identifier of the device accessory is not recognized by the server 226, the indication may be that the unique identifier of the device accessory is unauthenticated (i.e. step 410 in FIG. 4). Moreover, if the unique identifier of the device accessory is recognized but already assigned to a unique identifier of another mobile device, the indication may also be that the unique identifier of the device accessory is unauthenticated (i.e. step 410 in FIG. 4). However, if the unique identifier is recognized and not associated with a unique identifier of another mobile device, the indication may be that the unique identifier of the device accessory is authorized (i.e. step 408 in FIG. 4).

Based on the communication from the server 226, the feature module 160 of the mobile device 100 may enable or disable one or more functionalities of the mobile device 100 (i.e. step 406 or 408 in FIG. 4). In one embodiment, the mobile device 100 may enable or disable all of the functionalities of the mobile device 100. In other embodiments, if the mobile device 100 receives an indication relating to the type of the device accessory, the mobile device 100 may enable or disable one or more functionalities specific to the type of the device accessory. For example, where the device accessory is a holster (e.g. 600 of FIGS. 6A and 6B), one functionality may be sleep-in-holster to conserve battery. Another functionality may be auto switching of device profile to silent mode.

In another embodiment, the received unique identifier of the device accessory may be stored in memory 120 of the mobile device 100. In a further embodiment, the received information from the server, such as authentication information, may be stored in the memory 120 of the mobile device 100.

Figure 5:
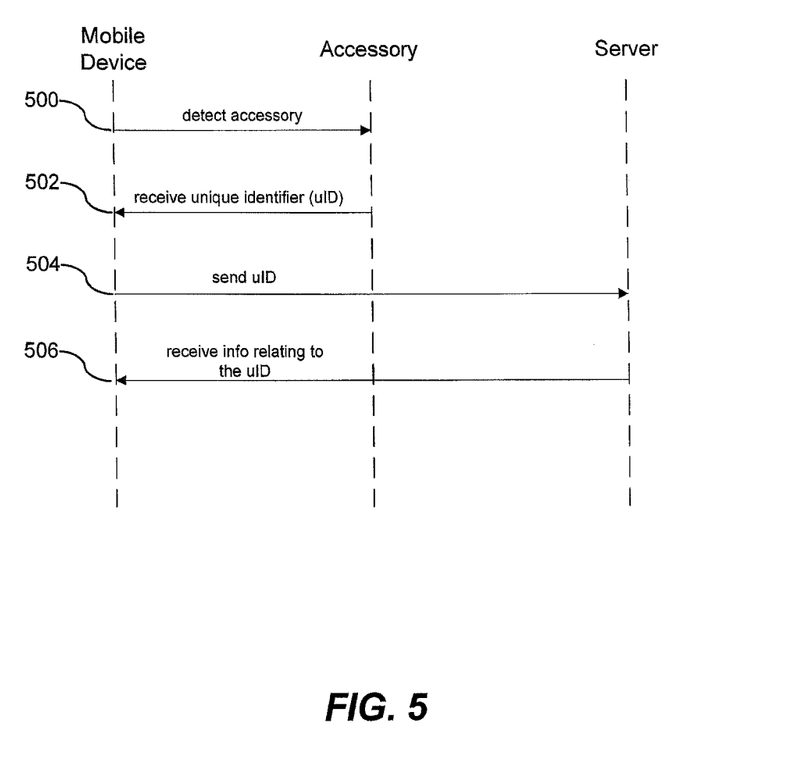
FIG. 5 is a messaging diagram of the message flow between the mobile device, device accessory and the server.

Turning to FIG. 5, a message exchange diagram between the mobile device, device accessory and server is shown. To authenticate the device accessory, the mobile device receives a unique identifier of the device accessory (i.e. 502 in FIG. 5). In another embodiment, prior to receiving the unique identifier, the mobile device 100 may detect the presence of the device accessory (i.e. 500 in FIG. 5) using the proximity detector (e.g. 150 of FIG. 1). After receiving the unique identifier from the accessory, the mobile device sends the unique identifier to the server (i.e. 504 in FIG. 5). Additionally, the mobile device may send its unique identifier, if assigned, to the server along with the received unique identifier of the device accessory. After the server processes the unique identifier sent by the mobile device 100, the mobile device receives information relating to the unique identifier from the server (i.e. 506 in FIG. 5).

Specific implementations involving a holster and charging cradle using NFC tags will now be described below. While not specifically described in this disclosure, the present technology may be implemented in other device accessories such as, but not limited to, a swivel mount for GPS, vehicle mount, a speaker stand, a headset, a docking station, a hands-free device and other device accessories.

An Authenticated Holster

Figure 6A:
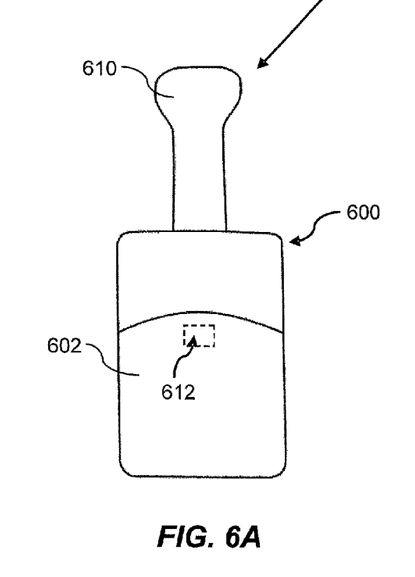
FIG. 6A is a front view of a holster for authentication with the mobile device of FIG. 1.
Figure 6B:
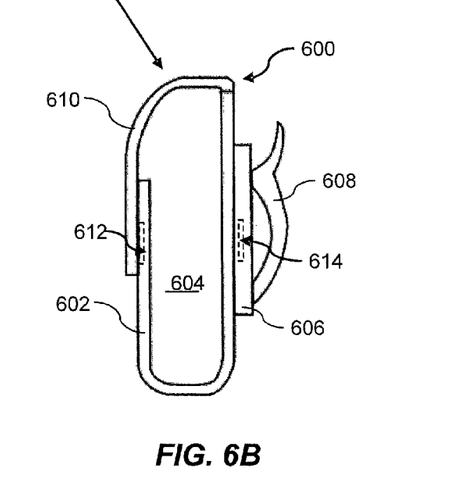
FIG. 6B is a side view of the holster in FIG. 6A.

In FIGS. 6A and 6B, there is shown an implementation of the present technology. In this implementation, the holster 600 has a housing 602 defining a pocket 604. On the backside of the housing 602, there is a backplate 606 with a clip 608. The holster 600 shown also has an over-clip 610 for securing the mobile device 100 inserted into the pocket 604. The holster 600 may include a magnet 612, which works in conjunction with the hall sensor 620 embedded in the mobile device 100. This allows the mobile device 100 to detect when it is placed in the pocket 604 of the housing 602 to place the mobile device 100 into, for example, sleep-in-holster mode. As a result, the mobile device 100 is able to conserve battery life. This may be one of the many functions of the mobile device 100 enabled by the holster 600.

The holster 600 implementing an embodiment of the present technology includes a wireless interface 614 including the unique identifier of the device accessory. Prior to use, the holster 600 is first authenticated by the mobile device 100 which implements an embodiment of the present technology. In this particular embodiment, the mobile device 100 first detects the proximity of the holster 600 using a proximity detector (e.g. 150 in FIG. 1) of the mobile device 100. The mobile device 100 then receives the unique identifier of the holster 600 from the wireless interface 614 and sends the unique identifier to the server (e.g. 226 in FIG. 2). In this implementation, the mobile device 100 also sends a unique identifier assigned to the mobile device 100 along with the unique identifier received from the holster 600. The server then determines whether the unique identifier of the holster 600 is a recognized unique identifier. If the unique identifier of the holster 600 is a recognized unique identifier, the server further determines if the unique identifier has been previously assigned to another mobile device. If not, the unique identifier of the holster 600 is associated with the unique identifier of the mobile device 100 and the server indicates to the mobile device 100 that the unique identifier of the holster 600 is authenticated. Otherwise (i.e. unique identifier of the holster 600 is not recognized or assigned to another device), the server indicates that the unique identifier of the holster 600 is unauthenticated. Furthermore, the mobile device 100 may receive information relating to the type of the device accessory, in this case a holster, along with the received information relating to the authenticity of the unique identifier.

For unauthenticated holster 600, some or all of the functionalities of the mobile device 100 may be disabled. For example, the sleep-in-holster functionality mentioned above may be disabled. So, while the holster 600 may still be used to hold the mobile device 100, convenient features such as the sleep-in-holster functionality may be disabled. As a further example, the mobile device 100 may have a feature to automatically switch the alert profile of the mobile device 100, which may be disabled for unauthenticated holster 600.

For authenticated holster 600, the mobile device 100 may automatically switch into silent mode when the mobile device 100 detects the magnet 612. Additional functionalities of the mobile device 100 may be enabled and disabled with the present technology.

Upon authentication, the mobile device 100 may store the unique identifier of the authenticated holster 600 in a memory of the mobile device 100 (e.g. 120 in FIG. 1) for later retrieval. Subsequently, when the mobile device 100 is used again with the holster 600, the mobile device 100 checks in the memory to verify that the holster 600 had been previously authenticated. If previously authenticated, the mobile device 100 may only re-authenticate the holster 600 if a predetermined amount of time has elapsed since the last authentication. Alternatively, re-authentication may take place each time.

An Authenticated Charging Cradle

Figure 7:
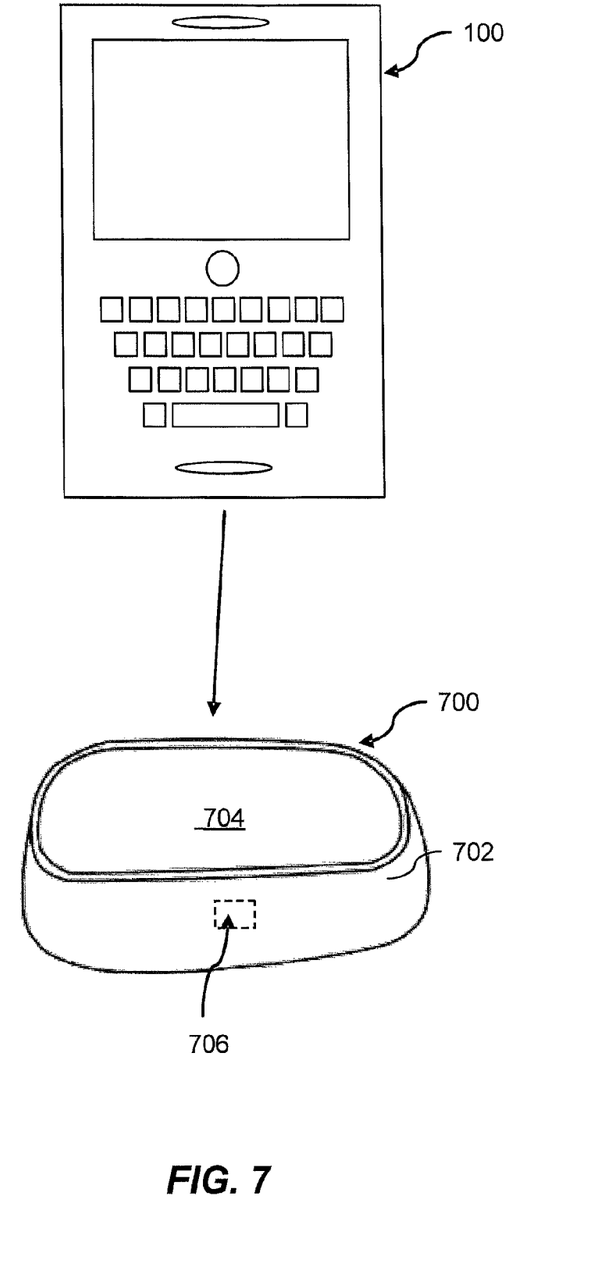
FIG. 7 is a perspective view of a charging cradle for authentication with the mobile device of FIG. 1.

In FIG. 7, there is shown another implementation of the present technology. The charging cradle 700 includes a cradle body 702 defining a receiving area 704 for receiving a mobile device 100. While the primary purpose of the charging cradle 700 may be for charging the mobile device 100, the charging cradle 700 may provide other functionalities such as connection to external speakers, data synchronization and other features.

Where the charging cradle 700 includes a wireless interface 706 including the unique identifier of the charging cradle 700, the charging cradle 700 is first authenticated by the mobile device 100 which implements an embodiment of the present technology. In this particular embodiment, to authenticate the charging cradle 700, the mobile device 100 is brought within proximity of the charging cradle 700. The proximity detector of the mobile device 100 then receives the unique identifier of the charging cradle 700 from the wireless interface 706. The unique identifier of the charging cradle 700 then sends the unique identifier to the server (e.g. 226 in FIG. 2). The sending of the unique identifier to the server may be auto-initiated by mobile device 100 upon detection of the wireless interface 706. Alternatively, or additionally, it may be initiated by a user of the mobile device 100 using a user interface.

When the server receives the unique identifier of the charging cradle 700, it confirms that the unique identifier is indeed a recognized unique identifier. This may be achieved by the server maintaining a list of recognized unique identifier and checking the unique identifier of the charging cradle 700 against this list. Other implementations are possible such as verifying that the unique identifier of the charging cradle 700 conforms to a predetermined algorithm. Once the server determines that the unique identifier of the charging cradle 700 is a recognized identifier, the result is communicated to the mobile device 100. In this implementation, where the unique identifier is recognized, the server indicates that the unique identifier is authenticated. By contrast, if the unique identifier of the charging cradle 700 is not recognized, the server indicates that the unique identifier is unauthenticated.

As an added security measure, the mobile device 100 may additionally send a unique identifier of the mobile device 100 with the unique identifier of the charging cradle 700. Thus, in addition to the server determining whether the unique identifier of the charging cradle 700 is recognized, it may also verify that the unique identifier of the charging cradle 700 was not previously assigned to another mobile device. This ensures that a previously authorized unique identifier cannot be paired with another mobile device.

For authenticated charging cradle 700, various functionalities of the mobile device 100 may be enabled. For example, the charging cradle 700 may trigger the mobile device 100 to automatically enable speakerphone to permit voice communication while the mobile device 100 is still in the charging cradle 700. Other functionalities such as auto call-forwarding to a home line may be possible.

Upon authentication, the mobile device 100 may store the unique identifier of the authenticated charging cradle 700 in a memory of the mobile device 100 (e.g. 120 in FIG. 1) for later retrieval. Subsequently, when the mobile device 100 is used again with the charging cradle 700, the mobile device 100 checks in the memory to verify that the charging cradle 700 had been previously authenticated. If previously authenticated, the mobile device 100 may only re-authenticate the charging cradle 700 if a predetermined amount of time has elapsed since the last authentication. Alternatively, re-authentication may take place each time.

While the present technology has been described in terms of specific implementations and configurations, further modifications, variations, modifications and refinements may be made without departing from the inventive concepts presented herein. For example, while the mobile device implementing the present technology was only described with a charging cradle and a holster, other device accessories are possible such as a swivel mount for GPS, vehicle mount, a speaker stand, a headset, a docking station, a hands-free device and other device accessories without departing from the scope of the disclosure as defined in the claims. The scope of the exclusive right sought by the Applicant(s) is therefore intended to be limited solely by the appended claims.

What is claimed is:

1. A method comprising:
    receiving at a mobile device a unique identifier from a device accessory;
    sending the received unique identifier to a server via a communication network;
    receiving information from the server relating to the unique identifier, the information comprising:
        an indication of a type of the device accessory, wherein the type of the device accessory is one of a plurality of defined device accessory categories; and
        an indication of authenticity of the unique identifier comprising that the device accessory is authenticated or unauthenticated, wherein the authenticated device accessory having a unique identifier recognized by the server, and the unauthenticated device accessory having a unique identifier unrecognized by the server; and
    enabling or disabling a functionality of the mobile device based on both the indication of the type of the device accessory received from the server, and whether the device accessory is authenticated or unauthenticated, the enabling or disabling allowing only a subset of functionality for an unauthenticated device accessory.

2. The method according to claim 1, further comprising:
    detecting a proximity of the device accessory using a proximity detector of the mobile device.

3. The method according to claim 1, further comprising sending a unique mobile device identifier to the server with the unique identifier.

4. The method according to claim 3, wherein the device accessory is authenticated or unauthenticated based on the authenticated device accessory having a unique identifier recognized by the server and not being associated with another mobile device, and the unauthenticated device accessory having a unique identifier unrecognized by the server or being associated with another mobile device.

5. The method according to claim 1, wherein the plurality of defined device accessory comprises a holster, a charger, a docking station, a swivel mount for GPS, a vehicle mount, a speaker stand, a headset, and a hands-free device.

6. The method according to claim 1, further comprising:
    storing the unique identifier in a memory of the mobile device.

7. The method according to claim 1, further comprising:
    storing the received information from the server in a memory of the mobile device.

8. A non-transitory computer-readable storage medium comprising instructions in code which when loaded into a memory and executed by a processor of a mobile device causes the mobile device to:
    receive at a mobile device a unique identifier from a device accessory;
    send the received unique identifier to a server via a communication network; and
    receive information from the server relating to the unique identifier, the information comprising:
        an indication of a type of the device accessory, wherein the type of the device accessory is one of a plurality of defined device accessory categories; and
        an indication of authenticity of the unique identifier comprising that the device accessory is authenticated or unauthenticated, wherein the authenticated device accessory having a unique identifier recognized by the server, and the unauthenticated device accessory having a unique identifier unrecognized by the server; and
    enabling or disabling a functionality of the mobile device based on both the indication of the type of the device accessory received from the server, and whether the device accessory is authenticated or unauthenticated, the enabling or disabling allowing only a subset of functionality for an unauthenticated device accessory.

9. The non-transitory computer-readable storage medium of claim 8, wherein the instructions further cause the mobile device to:
    detect a proximity of the device accessory using a proximity detector of the mobile device.

10. The non-transitory computer-readable storage medium of claim 8, wherein the instructions further cause the mobile device to store the received information from the server in a memory of the mobile device.

11. A mobile device comprising:
    a communication interface for transmitting and receiving information over a network;
    a processor for executing instructions; and
    a memory for storing instructions, which when executed by the processor configure the mobile device to:
        receive at the mobile device a unique identifier from a device accessory;
        send, using the communication interface, the received unique identifier to a server via a communication network;
        receive, using the communication interface, information from the server relating to the unique identifier, the information comprising:
            an indication of a type of the device accessory, wherein the type of the device accessory is one of a plurality of defined device accessory categories; and an indication of authenticity of the unique identifier comprising that the device accessory is authenticated or unauthenticated, wherein the authenticated device accessory having a unique identifier recognized by the server, and the unauthenticated device accessory having a unique identifier unrecognized by the server; and enable or disable a functionality of the mobile device based on both the indication of the type of the device accessory received from the server, and whether the device accessory is authenticated or unauthenticated, the enabling or disabling allowing only a subset of functionality for an unauthenticated device accessory.

12. The mobile device according to claim 11, further comprising:

a proximity detector for detecting a proximity of the device accessory.

13. The mobile device according to claim 11, wherein the instructions further configure the mobile device to send a unique mobile device identifier to the server with the unique identifier.

14. The mobile device according to claim 13, wherein the device accessory is authenticated or unauthenticated based on the authenticated device accessory having a unique identifier recognized by the server and not being associated with another mobile device, and the unauthenticated device accessory having a unique identifier unrecognized by the server or being associated with another mobile device.

15. The mobile device according to claim 11, wherein the plurality of defined device accessory categories comprises a holster, a charger, a docking station, a swivel mount for GPS, a vehicle mount, a speaker stand, a headset, and a hands-free device.

16. The mobile device according to claim 11, wherein the instructions further configure the mobile device to store the unique identifier in a memory of the mobile device.

17. The mobile device according to claim 11, wherein the instructions further configure the mobile device to store the received information from the server in a memory of the mobile device.

* * * * *